United States Patent

[11] 3,609,377

[72] Inventors David J. Pettitt;
Jerome Edward Murray, both of San Diego, Calif.
[21] Appl. No. 46,831
[22] Filed June 16, 1970
[45] Patented Sept. 28, 1971
[73] Assignee Kelco Company
San Diego, Calif.
Continuation-in-part of application Ser. No. 780,899, Dec. 3, 1968, now abandoned.

[54] METHOD FOR PREPARING ALKALI METAL SALTS OF CELLULOSE SULFATE AND STABILIZED ALKALI METAL SALTS OF CELLULOSE SULFATE
34 Claims, No Drawings

[52] U.S. Cl. .................................................. 260/215, 106/194
[51] Int. Cl. .................................................. C08b 5/14
[50] Field of Search .................................. 260/215; 106/194

[56] References Cited
UNITED STATES PATENTS

| | | | |
|---|---|---|---|
| 2,697,093 | 12/1954 | Jones | 260/215 |
| 3,070,595 | 12/1962 | Petracek et al. | 260/233.5 |
| 3,077,373 | 2/1963 | Kerr | 260/233.5 |
| 3,174,904 | 3/1965 | Sawhill | 260/215 |
| 3,200,110 | 8/1965 | Gollin et al. | 260/210 |
| 3,368,484 | 2/1968 | Fairchild | 260/215 |
| 3,507,855 | 4/1970 | Whistler | 260/215 |

Primary Examiner—Donald E. Czaja
Assistant Examiner—Ronald W. Griffin
Attorneys—Elwood S. Kendrick, Thomas H. Jones and Kendrick and Subkow

ABSTRACT: Improved process for preparing alkali metal salts of cellulose sulfate, said process comprising adding at least about a stoichiometric quantity of a powdered alkali metal salt of a weak inorganic acid, e.g., a carbonate, bicarbonate, borate, phosphate or silicate, to a reaction mixture containing cellulose sulfate in admixture with a lower N-dialkyl amide, water formed from the sulfation reaction, and optionally a diluent other than a lower N-dialkyl amide. A controlled quantity of water is added to the reaction mixture in conjunction with the addition of the alkali metal salt of a weak inorganic acid and alternatively, part or all of the added water may be introduced as chemically bound water in the alkali metal salt. The amount of water is sufficient to promote contact between the reactants but insufficient to form a pasty reaction mass. The neutralization reaction is conducted with agitation until neutralization is essentially completed which is accompanied by a pH change from highly acid to about 7.0 or above.

Method for preparing salts of cellulose sulfate having improved stability by coprecipitating said cellulose sulfate salts with an excess of an alkali metal salt of a weak inorganic acid in an effective amount to provide a stabilizing quantity of the salt of the weak inorganic acid in the precipitated product. Preferably, the excess of the salt of a weak inorganic acid is sufficient to provide at least about 0.1 percent by weight of the salt of the weak inorganic acid in the precipitated product. The coprecipitation may be carried out in the presence of divalent cations which enhance the coprecipitation and increase the percentage of the salt of the weak inorganic acid in the product.

A cellulose sulfate salt having improved stability, said salt containing an excess of a salt of a weak inorganic acid in an effective quantity to stabilize the cellulose sulfate salt. Preferably, the salt of the weak inorganic acid is present in an amount of at least about 0.1 percent by weight.

METHOD FOR PREPARING ALKALI METAL SALTS OF CELLULOSE SULFATE AND STABILIZED ALKALI METAL SALTS OF CELLULOSE SULFATE

This application is a continuation-in-part of our prior copending application Ser. No. 780,899 filed Dec. 3, 1968, now abandoned.

This invention relates to an improved method for preparation of salts of cellulose sulfate and to the products produced thereby.

The preparation of colloidal cellulose sulfates is described in commonly assigned prior copending U.S. Pat. application Ser. No. 457,738, filed June 28, 1965, the subject matter of which is incorporated herein by reference. As described in prior application 467,738, sulfate esters of cellulose having a degree of substitution between 1.0 and 3.0 and preferably 2.0 and 3.0 are prepared by treating cellulose with a sulfation complex of sulfur trioxide and a lower N-dialkyl amide. Preferably, the cellulose is admixed or diluted prior to sulfation with at least an equal weight of the same lower N-dialkyl amide which is present in the sulfation complex. Appropriate N-dialkyl amides include dimethyl formamide, diethyl formamide, dimethyl acetamide, diethyl acetamide, 1-methyl-2-pyrrolidinone, and dimethyl propionamide. A preferable N-dialkyl amide is dimethyl formamide.

The above-described sulfation complex contains at least one mole of the lower N-dialkyl amide for each mole of sulfur trioxide. Preferably, an excess of the N-dialkyl amide is present in the reaction mixture in order to serve as a diluent for the reactants. In addition thereto, the cellulose is preferably premixed with at least an equal amount by weight of the N-dialkyl amide used in preparing the sulfation complex. Other organic solvents may be used as a diluent for the cellulose, e.g., an N-dialkyl amide other than the one employed in preparing the complex. However, it is advantageous to use the same N-dialkyl amide as a diluent for the cellulose that is used in preparing the sulfation complex since this facilitates recovery of the diluent following the reaction.

The N-dialkyl amide, e.g., dimethyl formamide or other diluent, which is admixed with the cellulose prior to the sulfation step, should be employed in an amount in the range of about 1 to 10 times the weight of the cellulose while the sulfur trioxide-N-dialkyl amide complex at a molar ratio of one mole of sulfur trioxide per mole of lower N-dialkyl amide should be present in the reaction mixture in an amount which is 1 to 8 times the weight of the cellulose reactant. In general, it is desirable to use an amount of the sulfation complex which is equal to at least 2 times the weight of the cellulose reactant.

Any available form of cellulose may be employed in the above reaction and the choice thereof will, in general, be determined only by the purity and the nature of the product which is desired. Chemically treated cotton linters are a preferred source of cellulose, and a further source of cellulose is the cellulose derived from wood. Even ground wood itself can be employed, particularly those varieties of ground wood which are relatively rich in cellulose and relatively poor in lignin and other constituents, although use of these materials generally leads to a relatively low-grade product.

In general, the sulfation reaction is carried out at a reaction temperature of about 0 to about 35° C. and preferably at a temperature below about 30° C. The time required for complete esterification may range from less than 1 hour up to several hours, e.g., 8 hours, depending upon the reaction temperature employed and the relative concentrations of the reactants, including the amounts of diluent and sulfur trioxide present in the reaction mixture.

The sulfation complex which contains sulfur trioxide and a lower N-dialkyl amide reacts preferentially with water. Thus, the reaction should be carried out in the essential absence of moisture and the cellulose reactant should be nearly dry, i.e., preferably containing less than about 10 percent by weight of water. Otherwise, a relatively large portion of the sulfation complex will be consumed in reaction with water which will result in increasing the cost of production.

In view of the chemical nature of cellulose, a maximum degree of substitution (D.S.) of 3.0 is possible. In general, cellulose sulfate esters prepared according to the above procedure have a D.S. ranging from 1 to 3 and preferably about 2 to 3. The viscosities of these products, when measured at a 1 percent concentration in aqueous media, are generally in excess of 20 cps. and many of these products have viscosities in excess of cps. 100 cps. Such viscosities are measured with a Brookfield Synchro Electric Viscometer, Model LVF, at a spindle speed of 60 r.p.m. and a temperature of 25° C.

Lower viscosity cellulose sulfate esters, i.e., having viscosities lower than 20 cps. at a 1 percent concentration in aqueous media, may be prepared according to the procedure of U.S. Pat. application Ser. No. 467,738 filed June 28, 1965, or of U.S. Pat. application Ser. No. 815,187 filed Apr. 10, 1969, which describes an improvement thereof, by employing cellulose reactants having a lower molecular weight expressed in terms of the D.P. (degree of polymerization) of the cellulose reactant. Cellulose which may be used in preparing low-viscosity cellulose sulfate products may, for example, have a D.P. in the order of about 1,000 to about 500 or lower. Such materials are commercially available. The viscosity of the fibrous cellulose sulfate ester products prepared from such low D.P. cellulose reactants may, for example, range downward to about 11 cps. or lower at a 1 percent concentration in aqueous media.

Sulfate esters, as described above, may be employed in the preparation of an edible milk gel as described in U.S. Pat. application Ser. No. 467,738. In general, the cellulose sulfates prepared according to the above method have good reactivity with protein, such as, for example, casein.

The esters prepared according to the above-described procedure are half esters of sulfuric acid. Thus, one of the hydrogen ions, as originally present in sulfuric acid, is present in the cellulose sulfate esters and is free to react to give salts.

Following the preparation of a cellulose sulfate ester according the the above-described method, we have encountered problems in the formation of a salt by reaction of a base with the resulting cellulose sulfate half ester. On the addition of an aqueous solution of a base to the reaction mixture containing cellulose sulfate, water, unreacted cellulose, a lower N-dialkyl amide, e.g., dimethyl formamide and, optionally, an additional diluent, it was found that large lumps were formed during the neutralization procedure which made the product difficult to handle. Moreover, it was found that the neutralization was not homogeneous. The lumps which were found to form during addition of the aqueous solution of basic material contained unneutralized cellulose sulfate which, in the presence of the water formed during neutralization, degraded in molecular structure to give a material having inferior properties.

We also encountered other problems in the neutralization of the cellulose sulfate with aqueous alkali metal hydroxide in addition to the formation of lumps in the product mixture on addition of the basic material. It was found that the use of aqueous alkali metal hydroxides for neutralization produced high local concentrations of caustic which caused degradation of the solvent, e.g., dimethyl formamide, used in the process. When we used aqueous solutions of alkali metal bicarbonates or carbonates for neutralization, it was necessary to use relatively large quantities of water in order to make up the solutions. On addition of these solutions to the reaction mixture, excessive foaming resulted from the carbon dioxide produced in the neutralization reaction. In order to cope with the large quantity of foam, it was necessary to use a larger reactor to prevent spilling and waste of the product.

In solving the above problems which were encountered in the neutralization of the cellulose sulfate half esters, we have found that the addition of a powdered alkali metal salt of a weak inorganic acid or a mixture of such salts to the reaction mixture with a controlled quantity of water provides homogeneous neutralization to give the cellulose sulfate salt in a finely divided state which simplifies any subsequent purification procedures. Additionally, the finely divided state of the neutralized cellulose sulfate product provides a material which is more readily dissolved in water, thus improving the processing properties of the product material.

The success of this neutralization procedure is surprising in view of the heterogeneous nature of the reaction, i.e., the cellulose sulfate is in the form of a semisolid or gel and the alkali metal salt is introduced as a solid. Addition of a small amount of water is essential to promote contact between the reactants and by careful control of the amount of added water, the finely divided state of the mixture can be retained. The added water may, of course, be added whether partly or completely in the form of water of hydration.

A reaction mixture which is treated in accord with our process will contain cellulose sulfate, some dialkyl amide-sulfur trioxide complex, a small quantity of unreacted or only partially reacted cellulose, a lower N-dialkyl amide and optionally a diluent in addition to the amide. A typical reaction mixture resulting from the use of a sulfur trioxide—dimethyl formamide sulfation complex and dimethyl formamide as the reaction diluent contains about 50 percent to 80 percent by weight of dimethyl formamide, about 14 percent to about 37 percent by weight of cellulose sulfate, about 4 percent to about 12 percent unchanged sulfation complex and about 0.2 percent to about 2.0 percent by weight of unreacted or partially reacted, i.e., water insoluble, cellulose.

A weak inorganic acid is defined as an acid which has an ionization constant in water between about $10^{14}$ and about $10^{113}$. In this group are included boric acid, carbonic acid, monohydrogen carbonate, mono and dihydrogen phosphates, and di and trihydrogen pyrophosphates. Also included is silicic acid, a hypothetical acid, since its alkali metal salts have about the same basicity in water as the alkali metal salts of the acids mentioned previously. A comparison of the pH of 0.1 percent solution of salts of some weak acids are shown below:

11.3 10.7 11.0 9.3

*[Kirk-Othmer, Encyclopedia of Chemical Technology, 2nd Edition, Volume 3, Interscience Publishers, 1964, p. 624]

As shown, the pH of a 0.1 percent sodium silicate solution has a pH very close to that of sodium phosphate and therefore has about the same basicity as sodium phosphate. The hypothetical silicic acid has an ionization constant about the same as that of dihydrogen phosphate.

Typical of the alkali salts of weak inorganic acids which may be employed in our invention are sodium carbonate, sodium bicarbonate, sodium tripolyphosphate, sodium orthophosphate, potassium pyrophosphate, sodium borate, and the like. By weak inorganic acids, we refer to those having ionization constants, as measured in water at 25° C., which range between about $10^{14}$ to about $10^{113}$ and preferably between about $10^{16}$ and $10^{113}$.

The quantity of powdered alkali metal salt of a weak inorganic acid which is added is at least about stoichiometric with respect to the cellulose sulfate half ester so as to essentially completely neutralize it to form the corresponding salt. The controlled amount of water which is then added to the reaction mixture, including that which may be introduced as combined water with the alkali metal salt, is sufficient to promote contact between the reacting materials, i.e., the alkali metal salt of the weak inorganic acid and the cellulose sulfate half ester. If too much water is added to the reaction mixture, the product loses its finely divided consistency and turns into a pastelike mixture which is undesirable. In general, the total amount of water which is introduced can range from about 5 percent by weight of the reaction mixture and more preferably ranges from about 12 to about 22 percent by weight of the reaction mixture.

The reaction mixture is agitated during the addition of the alkali metal salt and during the addition of the controlled quantity of water and agitation is continued during the subsequent neutralization reaction. In general, we have found that from about 30 to about 60 minutes is a sufficient time period for the neutralization to take place.

During neutralization, the pH of the reaction mixture changed from an initial pH that is highly acid, e.g., less then 1.0, to a pH of 7.0 or higher. The neutralization reaction is exothermic and, in general, we have found that a neutralization temperature between about 10° to about 50° C. is satisfactory.

In determining the optimum amount of water to be added to the reaction mixture with the powdered alkali metal salt, test samples of the reaction mixture can be neutralized with the particular alkali metal salt chosen for neutralization while varying the amount of the added water, as between individual samples. If sufficient water is not added to the reaction mixture, degradation of the resulting cellulose sulfate salt will result. As described previously, if too much water is added to the reaction mixture, the reaction mixture will take on a pasty consistency.

Neutralization of the test samples can be conducted for ½ hour under the above-described reaction conditions after which the resulting cellulose sulfate salts are obtained by dissolving the cellulose sulfate salts in water and precipitating the salts by adding a lower alcohol, e.g., methyl or ethyl alcohol, acetone, or other water miscible solvent. A preferred lower alcohol for precipitation of the cellulose sulfate salt is isopropyl alcohol. After precipitation of the resulting cellulose sulfate salts, they may be dried and then dissolved in water at a concentration of 1 percent by weight. The viscosity of the 1 percent solution is then measured. The viscosity of the 1 percent solution is a good indication of the degree of degradation of the cellulose sulfate salt, i.e., the higher the viscosity of the 1 percent solution, the less the degree of degradation of the cellulose sulfate salt from a given type of cellulose such as cotton linters, wood pulp, etc. In this manner, the optimum amount of water to be added during the neutralization reaction can be determined so as to produce a cellulose sulfate salt from a given type of cellulose which, when dissolved in water at a 1 percent concentration, produces the highest viscosity.

Of the alkali metal salts of weak inorganic acids, we prefer the use of sodium carbonate or sodium bicarbonate, since these materials are generally cheaper and more plentiful than the other alkali metal salts. Since potassium ions in sufficient quantity form gels with certain of the cellulose sulfates which may be treated according to our process, special steps may be employed when neutralizing with potassium bicarbonate or potassium carbonate. When using potassium carbonate or potassium bicarbonate to neutralize the cellulose sulfate, we may employ a mixture containing less than the stoichiometric amount of the potassium salt required for neutralization in combination with sodium bicarbonate or sodium carbonate. The total quantity of the sodium and potassium salts is at least about stoichiometric with respect to the cellulose sulfate and the sodium salt may, for example, constitute about 10 percent of the total weight of the sodium and potassium salts.

In performing the above described neutralization process, we have found that salts of cellulose sulfate which contain a slight excess of an alkali metal salt of a weak inorganic acid, as defined above, are more stable than alkali metal salts of cellulose sulfate per se which have a tendency to be unstable in the presence of aqueous acid. We have found that the presence of preferably at least about 0.1 percent by weight or more of the salt of the weak inorganic acid in the neutralized cellulose sulfate salt provides a product having improved stability.

A most convenient way of uniformly incorporating an excess of an alkali metal salt of a weak inorganic acid into a neutralized cellulose sulfate salt is to use a stoichiometric excess of the powdered alkali metal salt of the weak inorganic acid in neutralizing the cellulose sulfate ester according to the procedure of our neutralization process as described above. Following the addition of a controlled amount of water to the resultant neutralization reaction mixture, as described previously, the neutralized cellulose sulfate salt may be purified by dissolving it in water, together with the excess alkali metal salt of the weak inorganic acid admixture therewith. The cellulose sulfate salt is then precipitated by the addition of a lower alcohol, acetone, or other water miscible solvent. The alkali metal salt of the weak inorganic acid is coprecipitated with the cellulose sulfate salt to provide an excess of the salt of the weak inorganic acid in an amount which is preferably at least about 0.1 percent by weight of the product.

Suprisingly, we have found that the amount of an alkali metal salt of a weak inorganic acid which is coprecipitated with the cellulose sulfate salt from an aqueous solution can be substantially increased by using water in the aqueous solution which contains from about 50 to about 500 parts per million (p.p.m.) of divalent cations such as calcium, magnesium, copper, nickel or zinc. Although not bound by any theory, the divalent cations appear to function by forming bonds with both the cellulose sulfate and the anion of the weak inorganic acid. As a result, the structure of the resulting product can be described as a cellulose sulfate salt having a degree of substitution between 1.0 and 3.0 and preferably 2.0 and 3.0. The salt may have a viscosity when measured at a 1 percent concentration in an aqueous medium in excess of 20 cps. and preferably 100 cps., and contain an excess of salt of a weak inorganic acid in an amount sufficient to stabilize the cellulose sulfate salt, the anions of the weak inorganic acid being held to said salt by a divalent cation. If the cellulose sulfate salt is prepared from cellulose having a low D.P., as described previously, the viscosity of the salt at concentration of 1 percent in aqueous media may range downwardly to about 11 cps. or lower.

By virtue of the enhanced coprecipitation of the alkali metal salt of a weak inorganic acid with the cellulose sulfate salt through use of water containing a divalent cation, a smaller excess of the alkali metal salt of the weak inorganic acid is required in order to obtain a stabilized product. This provides a saving in raw material costs. In general, the use of ground water which contains about 50 to 150 parts per million of calcium and/or magnesium serves admirably as a source of divalent ions for use in our process.

As described above, our process has several aspects. First, it provides more complete neutralization of cellulose sulfate to give the alkali metal salts thereof in a finely divided state which simplifies any subsequent purification procedures. Second, if the alkali metal salt of a weak inorganic acid used to neutralize the cellulose sulfate is employed in a stoichiometric excess, the product has improved stability. The neutralization of cellulose sulfate according to our invention does not require the use of a stoichiometric excess of the alkali metal salt of a weak inorganic acid. However, in order to both neutralize the cellulose sulfate and also to stabilize the neutralized product, it is necessary to use an excess of the alkali metal salt of the weak inorganic acid, as described above.

If desired, our invention may be employed to stabilize a water soluble salt of cellulose sulfate in a manner which is independent of the neutralization of cellulose sulfate to produce the salt. In stabilizing the salt, a water soluble salt of cellulose sulfate is added to water containing from about 50 to 500 parts per million of a divalent cation as described previously and also there is added thereto a water soluble salt or mixture of salts of a weak inorganic acid. The quantity of the salt of the weak inorganic acid which is added, e.g., about 1 to about 4 percent of the salt may be added, is sufficient to provide a stabilizing excess of the salt of the weak inorganic acid in the resulting product after addition of acetone, a lower alcohol or similar solvent to precipitate the cellulose sulfate salt. If the divalent cation is not present, e.g., demineralized water is used, a larger excess of the alkali metal salt of the weak inorganic acid may be added so as to provide an effective quantity, e.g., 0.1 percent by weight, of the salt of the weak inorganic acid, in the precipitated cellulose sulfate salt.

In order to further illustrate our invention, there are presented the following examples in which all parts and percentages are by weight unless otherwise indicated.

EXAMPLE I

Eighty-one grams of ether grade cotton cellulose which has been dried for 2 hours at 105° C. was soaked in 308 grams of dimethylformamide (DMF) for 16 hours, and cooled to 10° C. in a 2-liter stainless steel mixer with sigma blade agitation.

The dimethylformamide-sulfer trioxide (DMF-SO$_3$) complex was prepared by dropwise addition of 138 grams of liquid sulfur trioxide to 410 grams of anhydros dimethylformamide while maintaining the reaction temperature at 0-25° C. The slurry of DMF-SO$_3$ complex in DMF solvent at 0° C. was added in one portion to the chilled cellulose while passing a slow stream of nitrogen through the reactor to prevent absorption of atmospheric moisture. An ice-acetone-cooling mixture was circulated through the jacket of the reactor.

After a rapid increase in reaction temperature to 22° C. in 3 minutes after adding the complex, the temperature slowly fell in 30 minutes to 9° C., where it remained for the duration of the reaction.

After 1½ hours, the cellulose sulfate and excess DMF-SO$_3$ complex were neutralized by adding in one portion 306 grams of dry powdered sodium bicarbonate, followed by 150 grams of water. The neutralization was conducted at about 15° C. for about 30 minutes with stirring. The neutralized product was then dissolved in 5,700 ml. of water and sodium cellulose sulfate was precipitated by addition of 7,000 ml. of methyl alcohol. After drying at 45° C. the product weighed 240 grams and had a viscosity of 232 cps. in a 1 percent aqueous solution as measured at 25° C.

EXAMPLE II

To 243 grams (258 ml.) of dimethylformamide cooled to 0–5°C. was added 81 grams of ether grade cotton linters previously dried at 105° C. for 1½ hours. The cotton-DMF mixture was stirred for 1 hour of 8°-10° C. under nitrogen. A slurry of DMF-SO$_3$ complex prepared from 144 grams (75 ml.) of SO$_3$ and 304 grams (322 ml.) of DMF was cooled to 0–2°C. and added in one portion to the cold cellulose.

After stirring 70 minutes at 10°–13° C., 230 grams of dry powdered sodium bicarbonate was added in one portion, followed by 175 grams of water. After stirring for 30 minutes at 12–17°C. the resulting finely divided mixture was dissolved in approximately 6,500 ml. of water and the sodium cellulose sulfate was precipitated by adding 1,200 ml. of methyl alcohol. The precipitated product was washed with methyl alcohol and acetone, and dried overnight at 45°–50° C.

The yield of white fibrous sodium cellulose sulfate was 214.8 grams, of which 6.5 percent was unreacted or partially reacted (insoluble) cotton. The product had a viscosity of 290 cps. at 25° C. in 1 percent aqueous solution and a degree of substitution of 2.2.

EXAMPLE III

Ninety-eight grams of ether grade cotton linters containing about 10 percent by weight of water were mixed with 750 ml. of anhydrous DMF. The mixture was agitated for 5 minutes in a Waring blender and filtered, taking care to protect the linters from absorption of atmospheric moisture. This process was repeated twice more, after which the amount of DMF retained by the cotton linters was adjusted to 285 ml. Then a 36 gram sample of the mixture was taken for analysis, which showed that 0.8 percent by weight of water was present in the DMF-linters mixture.

A DMF-SO$_3$ complex, prepared as described in example II, was cooled to 0° C. and added to the cotton linters at 7° C. After 70 minutes, 125 grams of anhydrous powdered sodium carbonate was added in one portion, followed by 250 ml. of water, which was added as a fine spray. After stirring for 45 minutes at 18°–29° C., the mixture was dissolved in 5,500 ml. of water and the sodium cellulose sulfate was precipitated by adding 2,500ml. of isopropy alcohol. The product weighed 174 grams and had a viscosity of 400 cps. at 25° C. in a 1 percent aqueous solution.

EXAMPLE IV

To 88 grams of undried cotton linters containing approximately 6½ percent by weight of water was added 285 ml. of DMF. The mixture was agitated for 1 hour at room temperature, i.e., 25° C., followed by cooling to 820 C.

A DMF-$SO_3$ complex, prepared generally as in example II, except using 164 grams of sulfur trioxide and 322 ml. of DMF, was cooled to 0° C. and added in one portion to the linters. After a reaction time of ½ hour during which time the temperature ranged from 17°-26° C., 250 grams of dry powdered sodium bicarbonate were added. After spraying in 200 ml. of water, the mixture was stirred for ½ hour at 12°-17° C. and then was dissolved in 6,000 ml. of water. Isopropyl alcohol (3,500 ml.) was then added to precipitate the sodium cellulose sulfate, which, after drying, weighed 204 grams and had a viscosity of 192 cps. at 25° in a 1 percent aqueous solution.

When the above examples are repeated using potassium carbonate in admixture with about 10 percent sodium bicarbonate, the corresponding cellulose sulfate salts are obtained in finely divided form in good yield.

EXAMPLE V

To 81 grams of cotton linters dried ½ hour at 110° C. was added 260 ml. of DMF. The mixture was agitated 1 hour at 25° C. followed by cooling to 10° C.

A DMF-$SO_3$ complex in the same amount and prepared in the same manner as in example II was added in one portion. After a reaction time of ¾ hour, 520 grams of sodium tetraborate decahydrate was added in one portion. Since the combined water was equivalent to 245 grams of added water, only 100 ml. of additional water was sprayed into the reactor. The mixture was stirred for ½ hour during which time the temperature ranged from 11° to 18° C.

The sodium cellulose sulfate, after isolation by the previously described procedure, weighed 243 grams and has a 1 percent aqueous viscosity of 248 cps.

EXAMPLE VI

The cellulose sulfate was prepared as described in example V. In the neutralization step, however, 230 grams of sodium orthophosphate was added in one portion, followed by 200 ml. of water. The temperature rose from 10° C. to 30° C. during neutralization. After stirring for ½ hour, the sodium cellulose sulfate was isolated as before and reprecipitated to remove excess salt. The product had a 1 percent aqueous viscosity of 223 cps.

EXAMPLE VII

The cellulose sulfate was prepared as in example V. Sodium meta silicate nonahydrate, 340 grams, was, however, substituted for sodium borate in the neutralization step, and 100 ml. of water was sprayed into the mixture. After isolation and reprecipitation, the sodium cellulose sulfate had a 1 percent aqueous viscosity of 165 cps.

EXAMPLE VIII

An aqueous solution containing 3 percent by weight of essentially undergraded sodium cellulose sulfate having a viscosity in excess of 20 cps. together with an 8.6 percent by weight excess (based on the dry weight of sodium cellulose sulfate) of sodium bicarbonate was prepared in distilled water. The solution was divided into equal portions and various levels of calcium as calcium nitrate were added to the various portions. Following this, the sodium cellulose sulfate in the various portions was precipitated by the addition of isopropyl alcohol and the products obtained were dried at 50°-60° C. for several hours. The amount of bicarbonate anion which was retained by each of the sodium cellulose sulfate samples was determined by titration of 0.5 gram quantities of the various sodium cellulose sulfate samples dissolved in 50 ml. of distilled water. The titrations were accomplished by the addition of 0.01 Normal hydrochloric acid until the samples had a pH of 4.2-4.5 using methyl red as an indicator.

The following table shows the relationship between the amount of calcium which was added to the test portions, expressed as parts per million in water, and the amount of sodium bicarbonate which was retained by the precipitated sodium cellulose sulfate.

TABLE I

| Calcium added | Percent of Sodium Bicarbonate in the Sodium Cellulose Sulfate |
| --- | --- |
| None | 0.20 |
| 50 p.p.m. | 0.24 |
| 100 p.p.m. | 0.26 |
| 150 p.p.m. | 0.30 |
| 500 p.p.m. | 0.45 |

As shown by the above table, there was a direct relationship between the content of calcium in the test portions and the percentage of sodium bicarbonate which was coprecipitated with the sodium cellulose sulfate. As the quantity of calcium was increased, there was a corresponding increase in the percentage content of sodium bicarbonate in the sodium cellulose sulfate.

EXAMPLE IX

In further experiments, aqueous solutions were prepared which contained 3 percent by weight of a sodium cellulose sulfate as described in example VIII with a 2.6 percent by weight excess of sodium carbonate. The water employed in forming the solutions contained varying quantities of divalent ions as shown in the following table II. As shown in the following table, the products which resulted in precipitation with isopropyl alcohol contained varying quantities of sodium carbonate as determined by the titration procedure described in example VIII.

TABLE II

| Water Employed | % Sodium Carbonate in the Sodium Cellulose Sulfate |
| --- | --- |
| Distilled water | 0.09 |
| Ground water containing approximately 90 p.p.m. $Ca^{+2}$ and 30 p.p.m. $Mg^{+2}$ | 0.78 |
| Distilled water with 100 p.p.m. added $Ca^{+2}$ | 0.57 |
| Distilled water with 100 p.p.m. added $Mg^{+2}$ | 0.21 |
| Distilled water with 100 p.p.m. $Cu^{+2}$ | 0.61 |
| Distilled water with 100 p.p.m. $Zn^{+2}$ | 0.61 |

As shown in claim 1 above table, the presence of the various divalent ions was found to greatly increase the sodium carbonate content of the resulting sodium cellulose sulfate product. As the content of divalent cation was increased, it was found that there was a corresponding increase in the quantity of sodium carbonate which was coprecipitated with the sodium cellulose sulfate.

EXAMPLE X

In order to demonstrate that a minimum level of sodium carbonate or sodium bicarbonate in the cellulose sulfate salt provides a more stable product, accelerated aging tests were performed on various test solutions of a sodium cellulose sulfate having the general viscosity characteristics as described in example VIII which contained 1 percent by weight of sodium cellulose sulfate in water. The test solutions were each heated in an oven at 40° C. and were tested weekly to determine whether any changes had occurred in either their viscosity of pH. It was found that the test solutions which the sodium cellulose sulfate contained only an excess of about 0.02 percent by weight of sodium bicarbonate (based on the dry weight of sodium cellulose sulfate employed in making up the solution) lost 95 percent or more of their original viscosities and dropped in pH from about 7.3 to 2.0 after 2 weeks in the test oven. However, those test solutions in which the sodium cellulose sulfate contained in excess of 0.1 percent by weight of sodium bicarbonate (based on the weight of the dry sodium cellulose sulfate used in making the test solution) maintaining a pH above 7.0 and lost less than 15 percent of their original viscosities even after they had been kept in the test oven for an additional week at 40° C., i.e., a total of three weeks in the test oven.

As demonstrated by example X, our products which contain an excess of the alkali metal salt of a weak inorganic acid have greater stability than cellulose sulfate salts per se. These products were found to maintain their viscosity and their pH under adverse aging conditions whereas products which did not contain a stabilizing excess of the alkali metal salt of a weak inorganic acid were found to be somewhat unstable to aging.

EXAMPLE XI

To determine the effect of divalent metal ions on the amount of retained disodium phosphate, aqueous solutions of sodium cellulose sulfate were prepared containing 4 percent by weight of a sodium cellulose sulfate using the procedure described in example VIII with a 2 percent by weight excess of disodium phosphate. The water employed in forming the solutions contained calcium nitrate (calculated as $Ca^{+2}$) in the amounts shown in table III. The sodium cellulose sulfate was precipitated as described in example VIII and analyzed for phosphorus by precipitation and titration of the phosphomolybdate complex according to a standard procedure as described at page 814 of Standard Methods of Chemical Analysis, 6th Ed., N. H. Furman, Ed., Van Nostrand and Company, Inc., Princeton, N.J., 1962.

TABLE III

| Calcium Added | Weight percent Disodium Phosphate in the Sodium Cellulose Sulfate |
|---|---|
| None | 0.07 |
| 50 p.p.m. | 0.23 |
| 100 p.p.m. | 0.33 |
| 200 p.p.m. | 0.60 |

The analysis was checked by titration of the disodium phosphate in samples of sodium cellulose sulfate (SCS) with 0.01N HC1 to a methyl red end point. As shown by the above table, the amount of disodium phosphate retained by SCS is directly related to the calcium ion concentration. The effect of disodium phosphate on the thermal stability of SCS solutions was determined as described in example X. Test solutions containing no added disodium phosphate lost 95 percent or more of their original viscosities and dropped in pH from 6.6 to 1.9 after 2 weeks in the test oven at 40° C. Those test solutions in which the SCS contained greater than 0.1 percent by weight of disodium phosphate maintained a pH above 6.5 and lost less than 15 percent of their original viscosities after 10 weeks in the test oven at 40° C.

EXAMPLE XII

Using a procedure similar to that in example XI, 2 percent by weight of sodium silicate (based on the weight of sodium cellulose sulfate) was added to sodium cellulose sulfate using distilled water in one case and tap water containing approximately 100 p.p.m. divalent cations, primarily magnesium and calcium, in another. The SCS was precipitated as usual and was dried and analyzed for silicates by titration with standard HC1. The sample of cellulose sulfate which contained no divalent cations had 0.06 percent sodium silicate while that worked up in water which contained about 100 p.p.m. of divalent cations contained 0.81 percent sodium silicate as $Na_2SiO_3$.

EXAMPLE XIII

Two percent of sodium borate ($Na_2B_4O_7$) based on the weight of sodium cellulose sulfate, was added to a 4 percent solution of sodium cellulose sulfate in water containing from 0 to 500 p.p.m. of calcium ion and the product was isolated as in example X. The sodium borate content was determined by titration with standard HC1 as before. The results are shown in table IV.

TABLE IV

| Calcium Added | Percent Sodium Borate Retained as $Na_2B_4O_7$ |
|---|---|
| None | 0.09 |
| 100 p.p.m. | 0.12 |
| 200 p.p.m. | 0.21 |
| 500 p.p.m. | 0.63 |

As shown in table IV, the amount of the sodium borate retained by sodium cellulose sulfate was proportional to the quantity of the divalent calcium ions in the sodium cellulose sulfate solution. As the content of calcium ions was increased, the content of sodium borate in the product was likewise increased—together with the stability of the sodium cellulose sulfate product.

EXAMPLE XIV

An 87 gram sample of cotton linters having a degree of polymerization of approximately 900 was dried for ½ hour at 105 ° C. The 81 grams of dried linters was mixed with 245 grams of anhydrous DMF and allowed to stand overnight at 40°–50 C. in a sealed container. The DMF-linters mixture was then transferred to a 2-liter sigma blade mixer and cooled to 10° C. under a nitrogen atmosphere. A slurry of SMF-$SO_3$ complex in excess DMF was prepared by dropwise addition of 144 grams of sulfur trioxide to 305 grams of DMF while maintaining the temperature below 25° C. The DMF-$SO_3$ complex was cooled to 0° C. and added to the cold cellulose in one portion with stirring. After stirring for 1 hour, 225 grams of sodium bicarbonate was added followed by 75 ml. of water.

The DMF solvent was removed by slurrying the neutralized reaction mixture in a combination of 700 ml. of water and 700 ml. of methyl alcohol. The crude sodium cellulose sulfate contained some unreacted or partially reacted linters as well as sodium sulfate. After dissolving the crude product in 3,500 ml. of tap water containing approximately 60 p.p.m. calcium and filtering, 3,500 ml. of isopropyl alcohol was added to precipitate the sodium cellulose sulfate. The product was washed with isopropyl alcohol and dried at 45°–50° C. The yield of white sodium cellulose sulfate was 202.8 grams. The product had a 1 percent by weight viscosity in aqueous media of 18 cps. and a 15 percent by weight viscosity in aqueous media of 7,000 cps., as determined with a Brookfield Viscometer, Model LVF, at about 25° C.

EXAMPLE XV

The sulfation procedure in example XIV was repeated with the exception that the cellulose reactant was a wood cellulose having a degree of polymerization of approximately 625. There was obtained 249.1 grams of sodium cellulose sulfate with a 1 percent by weight aqueous viscosity of 12 cps. and a 15 percent by weight aqueous viscosity of 3,210 cps. determined with a Brookfield Viscometer as in example XIV.

As demonstrated in the foregoing specification, our invention has a number of aspects. It provides a method for the homogeneous neutralization of cellulose sulfate to obtain an alkali metal salt of cellulose sulfate in finely divided form. It also provides a method for preparing alkali metal salts of cellulose sulfate having improved stability and containing a stabilizing excess of an alkali metal salt of a weak inorganic acid, and it provides a novel composition of matter comprising an alkali metal salt of cellulose sulfate which contains an alkali metal salt of a weak organic acid in an amount which is effective to stabilize the cellulose sulfate salt. It should be understood that in all of the embodiments of our invention, the precursor cellulose sulfate is colloidal in nature and has a D.S. ranging from 1 to 3 and preferably about 2 to 3.

Having fully defined our invention in the foregoing specification, we desire to be limited only by the lawful scope of the following claims.

1. A process for preparing an alkali metal salt of cellulose sulfate by neutralizing cellulose sulfate, said process comprising adding at least about a stoichiometric amount of a powdered alkali metal salt of a weak inorganic acid having an ionization constant in water between about $10^{14}$ and $10^{113}$ to a sulfation reaction mixture containing cellulose sulfate, a lower N-dialkyl amide, a lower N-dialkyl amide-sulfur trioxide complex, and water-insoluble cellulose; adding a controlled amount of water which is sufficient to promote contact between said powdered salt and said cellulose sulfate to obtain homogeneous neutralization without any substantial degradation of said cellulose sulfate but is insufficient to produce a pastelike reaction mass, said amount of water ranging from about 5 to about 30 percent by weight of said sulfation reaction mixture including any water of hydration in said powdered alkali metal salt, and agitating the reaction mixture during the neutralization reaction.

2. The process of claim 1 wherein said powdered alkali metal salt is sodium carbonate.

3. The process of claim 1 wherein said powdered alkali metal salt is sodium bicarbonate.

4. The process of claim 1 wherein said powdered alkali metal salt is a sodium phosphate.

5. The process of claim 1 wherein said powdered alkali metal salt is a sodium borate.

6. The process of claim 1 wherein said powdered alkali metal salt is a sodium silicate.

7. The process of claim 1 wherein said lower N-dialkyl amide is dimethyl formamide.

8. The process of claim 1 wherein the amount of added water ranges between about 12 to about 22 percent by weight of said sulfation reaction mixture.

9. The process of claim 1 wherein said alkali metal salt of a weak inorganic acid is employed in an amount sufficient to provide a stabilizing excess of said salt in said alkali metal salt of cellulose sulfate.

10. The process of claim 9 wherein said alkali metal salt of a weak inorganic acid is employed in an amount sufficient to provide an excess of at least about 0.1 percent by weight of said salt in said alkali metal salt of cellulose sulfate.

11. The process of claim 9 wherein said neutralization reaction is carried out in the presence of divalent cations selected from the group consisting of calcium, magnesium, copper, nickel or zinc cations, or mixtures thereof.

12. A process for preparing a stabilized water-soluble salt of cellulose sulfate having a degree of substitution ranging from 1 to 3, said process comprising admixing in aqueous media a cellulose sulfate or a water-soluble salt thereof, having a degree of substitution ranging from 1 to 3 with an alkali metal salt of a weak inorganic acid having an ionization constant ranging between about $10^{14}$ and $10^{113}$, and coprecipitating from said aqueous media a water-soluble salt of cellulose sulfate in admixture with said alkali metal salt of a weak inorganic acid in an amount sufficient to stabilize said coprecipitated salt of cellulose sulfate.

13. The process of claim 12 wherein said alkali metal salt of a weak inorganic acid is coprecipitated in an amount sufficient to constitute about 0.1 percent by weight of the precipitated salt of cellulose sulfate.

14. The process of claim 12 wherein said aqueous media contains from about 50 to about 500 parts per million of divalent cations selected from the group consisting of calcium, magnesium, copper, nickel, or zinc cations, or mixtures thereof.

15. The process of claim 12 wherein said cellulose sulfate or water-soluble salt thereof has a viscosity at a 1 percent concentration in aqueous media in excess of 20 cps., as measured with a Brookfield Synchro Electric Viscometer, Model LVF, at a spindle speed of 60 r.p.m. and a temperature of 25° C.

16. The process of claim 12 wherein said cellulose sulfate or water-soluble salt thereof has a viscosity at a 1 percent concentration in aqueous media of about 20 cps. or less ranging down to about 11 cps., as measured with a Brookfield Synchro Electric Viscometer, Model LVF, at a spindle speed of 60 r.p.m. and a temperature of 25° C.

17. The process of claim 14 wherein said aqueous media is ground water containing from about 50 to about 150 parts per million of calcium or magnesium ions or mixtures thereof.

18. The process of claim 12 wherein said alkali metal salt of a weak inorganic acid is a carbonate, a bicarbonate, a silicate, or a phosphate salt, or mixtures thereof.

19. The process of claim 12 wherein said cellulose sulfate has a degree of substitution ranging from about 2 to 3.

20. The process of claim 19 wherein said cellulose sulfate has a viscosity in a 1 percent concentration in aqueous media in excess of 100 cps. as measured with a Brookfield Synchro Electric Viscometer, Model LVF, at a spindle speed of 60 r.p.m. and a temperature of 25° C.

21. The process of claim 12 wherein a lower alcohol or acetone is added to said aqueous media to cause coprecipitation.

22. The process of claim 21 wherein said lower alcohol is isopropyl alcohol.

23. A composition of an alkali metal salt of cellulose sulfate having improved stability, said salt having a degree of substitution from about 1 to 3, said salt having uniformly incorporated therein an alkali metal salt of a weak inorganic acid in an effective amount to stabilize said cellulose sulfate salt, said weak inorganic acid having an ionization constant in water between about $10^{14}$ and $10^{113}$.

24. The composition of claim 23 wherein said alkali metal salt of cellulose sulfate has a viscosity in excess of 20 cps. at a concentration of 1 percent by weight in aqueous media as measured by a Brookfield Synchro Electric Viscometer, Model LVF, at a spindle speed of 60 r.p.m. and a temperature of 25° C.

25. The composition of claim 23 wherein said alkali metal salt of cellulose sulfate has a viscosity of about 20 cps. or less ranging down to about 11 cps. at a concentration of 1 percent by weight in aqueous media as measured by a Brookfield Synchro Electric Viscometer, Model LVF, at a spindle speed of 60 r.p.m. and a temperature of 25° C.

26. The composition of claim 24 wherein said cellulose sulfate salt has a viscosity in excess of 100 cps. at a concentration of 1 percent by weight in aqueous media, as measured by a Brookfield Synchro Electric Viscometer, Model LVF, at a spindle speed of 60 r.p.m. and a temperature of 25° C.

27. The composition of claim 24 wherein said alkali metal salt of cellulose sulfate has a degree of substitution from about 2 to 3.

28. The composition of claim 25 wherein said alkali metal salt of cellulose sulfate has a degree of substitution from about 2 to 3.

29. The composition of claim 26 wherein said alkali metal salt of cellulose sulfate has a degree of substitution from about 2 to 3.

30. The composition of claim 23 wherein said weak inorganic acid has an ionization constant in water between about $10^{16}$ and $10^{113}$.

31. The composition of claim 23 wherein said alkali metal salt of a weak inorganic acid is present in said cellulose sulfate salt in at least about 0.1 percent by weight of said cellulose sulfate salt.

32. The composition of claim 31 wherein said alkali metal salt of a weak inorganic acid is a carbonate, a bicarbonate, a phosphate, a borate, or a silicate salt, or mixtures thereof.

33. The composition of claim 23 containing divalent cations selected from the group consisting of calcium, magnesium, copper, nickel, or zinc, or mixtures thereof.

34. The composition of claim 32 containing divalent cations selected from the group consisting of calcium, magnesium, copper, nickel, or mixtures thereof.

UNITED STATES PATENT OFFICE
CERTIFICATE OF CORRECTION

Patent No. 3,609,377          Dated September 28, 1971

Inventor(s) David J. Pettitt and Jerome Edward Murray

It is certified that error appears in the above-identified patent and that said Letters Patent are hereby corrected as shown below:

Column 3, line 29, "$10^{14}$" should be -- $10^{-4}$ --; line 30, "$10^{113}$" should be -- $10^{-13}$ --; line 55, "$10^{14}$ ... $10^{113}$" should be -- $10^{-4}$ ... $10^{-13}$ --; line 56, "$10^{16}$ ... $10^{113}$" should be -- $10^{-6}$ ... $10^{-13}$ --. Column 6, line 9, "anhydros" should be -- anhydrous --. Column 11, lines 22 and 69, and also at Column 12, line 45, "$10^{14}$ and $10^{113}$" should be -- $10^{-4}$ and $10^{-13}$ --. Column 12, line 75, "$10^{16}$ and $10^{113}$" should be -- $10^{-6}$ and $10^{-13}$ --.

Signed and sealed this 20th day of June 1972.

(SEAL)
Attest:

EDWARD M. FLETCHER, JR.          ROBERT GOTTSCHALK
Attesting Officer          Commissioner of Patents